(12) United States Patent
Schwarz

(10) Patent No.: US 11,722,487 B2
(45) Date of Patent: Aug. 8, 2023

(54) CONNECTING AN END DEVICE TO A LINKABLE COMPUTER INFRASTRUCTURE

(71) Applicant: Robert Schwarz, Zirndorf (DE)

(72) Inventor: Robert Schwarz, Zirndorf (DE)

(73) Assignee: Siemens Aktiengesellschaft, Munich (DE)

( * ) Notice: Subject to any disclaimer, the term of this patent is extended or adjusted under 35 U.S.C. 154(b) by 849 days.

(21) Appl. No.: 16/447,301

(22) Filed: Jun. 20, 2019

(65) Prior Publication Data

US 2019/0394199 A1 Dec. 26, 2019

(30) Foreign Application Priority Data

Jun. 20, 2018 (EP) ..................... 18178764

(51) Int. Cl.
*H04L 29/06* (2006.01)
*H04L 9/40* (2022.01)
(Continued)

(52) U.S. Cl.
CPC .......... *H04L 63/0876* (2013.01); *G06F 13/14* (2013.01); *H04L 63/0823* (2013.01); *H04L 67/5683* (2022.05)

(58) Field of Classification Search
CPC ... H04L 9/3263; H04L 63/0209; H04L 63/10; H04L 63/0876; H04L 63/0823;
(Continued)

(56) References Cited

U.S. PATENT DOCUMENTS 8,856,885 B2 * 10/2014 Huang .................... G06F 21/33
713/168
11,240,240 B1 * 2/2022 Williams ............ H04L 63/0846
(Continued)

FOREIGN PATENT DOCUMENTS

CN 104125251 A 10/2014
CN 105282122 A 1/2016
(Continued)

OTHER PUBLICATIONS

Yun-Kyung Lee et al, Home Device Authentication Method based on PKI, IEEE, Dec. 8, 2007, pp. 1-5. (Year: 2007).*
(Continued)

*Primary Examiner* — Luu T Pham
*Assistant Examiner* — Jenise E Jackson
(74) *Attorney, Agent, or Firm* — Lempia Summerfield Katz LLC

(57) ABSTRACT

A method for connecting an end device to a linkable computer infrastructure is provided. A device certificate is created and supplied to a user of the end device. The device certificate is input into the end device. A data link from the end device to an access zone connected upstream of functions of the linkable computer infrastructure is produced. The access zone may be selectively separated from the functions of the linkable computer infrastructure by this link. The end device is registered in the access zone using the device certificate. By access of a function from the linkable computer infrastructure to the end device registered in the access zone, this end device is identified for the linkable computer infrastructure. With successful identification of the end device, use of the linkable computer infrastructure is enabled for the end device.

13 Claims, 1 Drawing Sheet

(51) Int. Cl.
*G06F 13/14* (2006.01)
*H04L 67/5683* (2022.01)

(58) Field of Classification Search
CPC ... H04L 67/2857; G06F 21/33; G06F 21/335; G06F 21/44; G06F 13/14
See application file for complete search history.

(56) References Cited

U.S. PATENT DOCUMENTS

| | | | |
|---|---|---|---|
| 2009/0138974 A1* | 5/2009 | Perdomo | G06F 21/41 726/28 |
| 2012/0266231 A1* | 10/2012 | Spiers | H04L 9/3234 726/12 |
| 2014/0090037 A1* | 3/2014 | Singh | H04L 63/0815 726/8 |
| 2014/0208390 A1 | 7/2014 | Brown | |
| 2014/0282916 A1 | 9/2014 | Gast | |
| 2015/0215301 A1 | 7/2015 | Fischer | |
| 2016/0112406 A1 | 4/2016 | Bugrov | |
| 2016/0119257 A1* | 4/2016 | Yun | H04L 12/2823 709/206 |
| 2016/0197962 A1* | 7/2016 | Winn | H04L 63/0823 713/168 |
| 2016/0248746 A1 | 8/2016 | James et al. | |
| 2017/0223057 A1* | 8/2017 | Amiri | H04L 67/306 |
| 2017/0257221 A1 | 9/2017 | Peng | |
| 2017/0364527 A1* | 12/2017 | Adler | G06F 16/144 |
| 2017/0373860 A1* | 12/2017 | Kshirsagar | H04L 67/02 |
| 2018/0152447 A1 | 5/2018 | Brockhaus | |
| 2018/0323977 A1* | 11/2018 | Hojsik | H04L 63/061 |
| 2018/0375852 A1* | 12/2018 | Thom | H04W 12/128 |
| 2019/0104411 A1* | 4/2019 | Hotchkiss | H04L 63/107 |

FOREIGN PATENT DOCUMENTS

| | | |
|---|---|---|
| DE | 102012215167 A1 | 2/2014 |
| DE | 102015211345 A1 | 12/2016 |

OTHER PUBLICATIONS

Jin-Bum Huwang et al, Two-Layered PKI Model for Device Authentication in Multi-Domain Home Networks, IEEE, Jul. 1, 2006, IEEE, pp. 1-6. (Year: 2006).*
European Search Report for corresponding Application No. 18178764.9-1218 filed Oct. 24, 2018.
Chinese Office Action for Chinese Application No. 201910531937.4 dated Jun. 16, 2021, with English translation.
Chinese Decision to Grant for Chinese Application No. 201910531937.4 dated Nov. 3, 2021, with English translation.

* cited by examiner

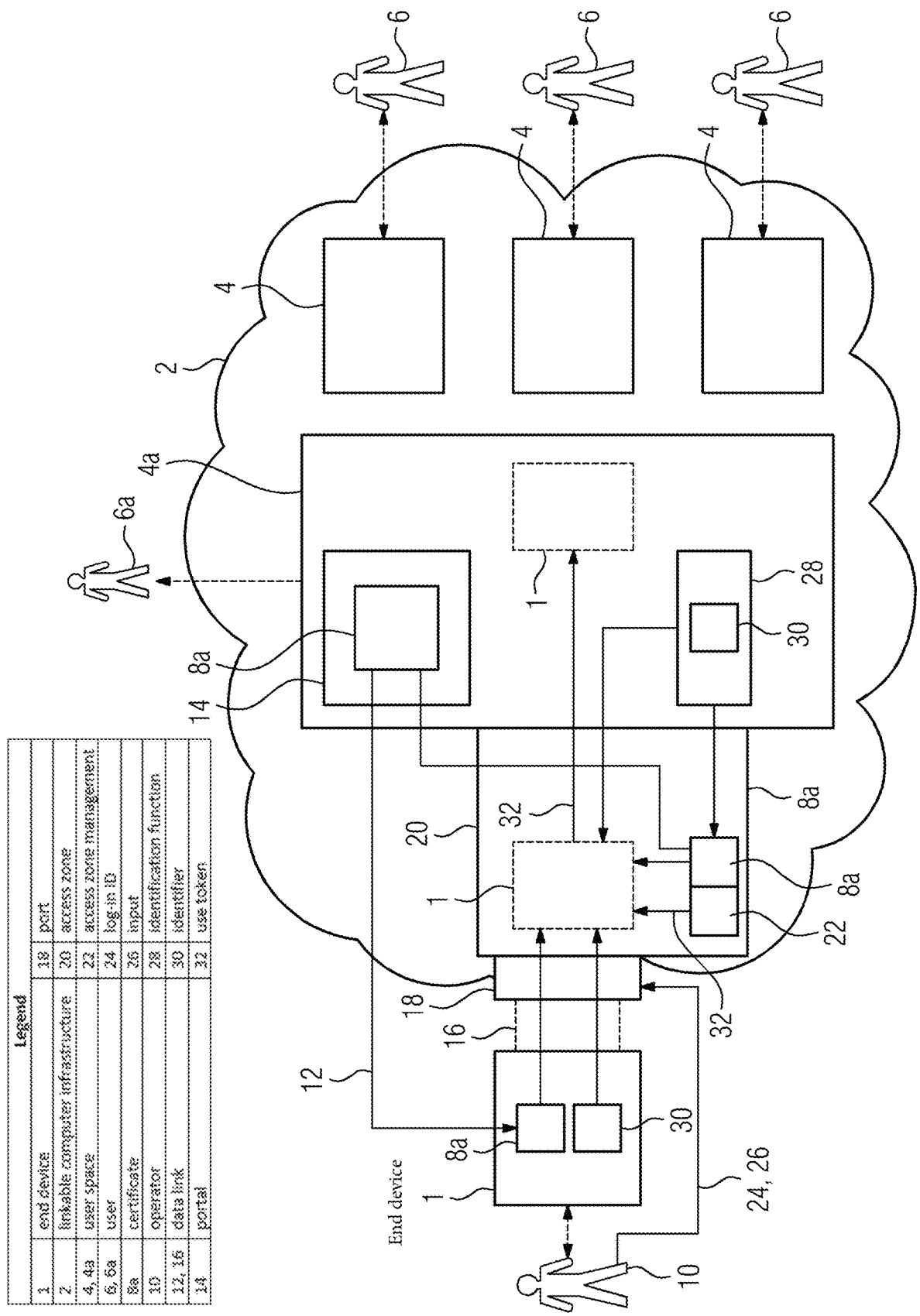

CONNECTING AN END DEVICE TO A LINKABLE COMPUTER INFRASTRUCTURE

This application claims the benefit of EP 18178764.9, filed on Jun. 20, 2018, which is hereby incorporated by reference in its entirety.

BACKGROUND

The present embodiments relate to connecting an end device to a linkable computer infrastructure.

The "Internet of Things" (IoT) is a concept to link together physically tangible devices that, in principle, may be spatially separate from each other to any extent, and to allow the physically tangible devices to therefore work together via appropriate communications techniques and protocols. This may be the case, for example, for machines in construction processes where construction systems at different locations inform each other about a progression of production or also about problems occurring at one location, and thus coordinate with one another for more efficient utilization of the systems. Similarly, for example, systems for regenerative energy production as well as systems for energy transfer may communicate with each other in order to regulate the input and utilization in the network as a function of the powers generated at different locations.

DE 10 2012 215 167 A1 describes a method for authentication of a first device by way of an exchange within a network. The first device, in an identity space of a data structure, transmits a first identifier to the exchange. The first device, in an expanded identity space of the data structure, transmits at least one additional identifier, to the exchange. The exchange authenticates the first device as a function of the transmitted first identifier and the transmitted additional identifier.

DE 10 2015 211 345 A1 describes a network device including two interfaces for connection to an access-protected access point of a data network and to a network component that is configured to enable access to the data network via the access point. The network device is configured such that in the case of a connected access point and connected network components, with authentication data, the network device is authenticated at the access point. In the case of successful authentication, the network device permits access of the connected network components to the data network via the access point for at least those network components that satisfy one or more predetermined criteria.

US 2016112406 A1 describes systems and methods for carrying out an access control in an industrial control system. A first component of an industrial control system may be connected to a second component of the industrial control system. For the first component a digital certificate may be generated. The digital certificate includes both authentication information as well as authorization information associated with the first component. The first component may transmit the digital certificate to the second component, and the second component may extract the authorization information from the digital certificate. The second component may identify a set of access rights based on the extracted authorization information and authorize the first component access to the second component based on the set of identified access rights.

The creation of a suitable communications protocol constitutes a fundamental challenge in this connection for linking real devices and a successful connection for utilization of corresponding synergies. The different devices to be linked, which may often be produced by various manufacturers, are to supply information to the other participants in the IoT in a way in which the information may be processed by the other participants. This applies since for a number of functions, large systems often use protocols that are provided by different standards according to function.

For a communications protocol to connect devices to the IoT, the security of the connection inherent to the protocol is an important aspect. It should be provided that only correspondingly authorized devices in a back-end of the IoT network obtain access to particular functions, so the authentication for a verification of this authorization is to be optimally secure.

An optimally simple and user-friendly connection of the device is often also desired, however. A device is often connected in particular cloud services via a prior registration of the device in a backend of the cloud (e.g., by storing a private key), although, owing to the distribution of the private key of the device, this is very laborious, and therefore leads to inefficient effort with an increasing number of devices for connection.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method for connecting an end device to a space of a linkable computer infrastructure allocated to a user carried out as conveniently as possible with an optimally high level of security for the user is provided.

A method for connecting an end device to a linkable computer infrastructure, in which a device certificate (e.g., a digital device certificate) is created and allocated to a user of the end device, is provided. The device certificate is input into the end device. A data link from the end device to an access zone connected upstream of the functions of the linkable computer infrastructure is produced. The access zone may be selectively separated from the functions of the linkable computer infrastructure by this link. The end device is registered in the access zone using the device certificate. By access of a function from the linkable computer infrastructure to the end device registered in the access zone, this device is identified for the linkable computer infrastructure. With successful identification of the end device, use of the linkable computer infrastructure and, for example, corresponding functions is enabled for this device.

The linkable computer infrastructure includes in this connection, for example, one or more storage devices and/or processors or computers (e.g., computing devices) and/or program applications that may be run on the computing devices, and which may be stored, for example, on the storage devices. The linkable computer infrastructure is accessible, for example, in a decentralized manner (e.g., from a large number of possible physical locations that may have considerable distances between the possible physical locations in each case). Access may occur, for example, via an Internet connection. In this respect, the linkable computer infrastructure may be used independently of where the physical components (e.g., one or more storage devices and/or processors or computers) are implemented by the linking with a participant that may be provided, for example, by the end device, from the respective location of the participant.

The device certificate is created, for example, by the linkable computer infrastructure, where a separate certification function may be supplied, for example, in the framework of one of its functions. The one function may be provided and adapted for the creation of device certificates. The device certificate may be individually created for each individual end device for connection or may also be created as a universal device certificate (e.g., once) for a large number of end devices. The universal device certificate serves, for example, to register the end device in the access zone. Similarly, mixed forms of the implementation are possible by, for example, one uniform device certificate respectively being created for a plurality of, with respect to particular features, similar end devices, with different device certificates being created for different end devices.

The device certificate may be supplied to the user of the end device for download via a corresponding portal in the framework of the functions of the linkable computer infrastructure, but may also be rendered accessible on a physical data carrier, which includes a non-volatile storage device (e.g., on a USB storage device or a CD-ROM). Depending on the way in which the device certificate is supplied to the user of the end device, the input of the device certificate into the end device may occur via a direct data link of the end device, which is connected to a computer of the user, to the corresponding download portal of the linkable computer infrastructure. Alternatively thereto, the input may also be made via a wired connection to a USB storage device or to a computer, which is equipped with the corresponding storage medium.

Use of the linkable computer infrastructure by the end device with successful identification, for example, includes that the end device, in the framework of authorizations, which the user and/or a manufacturer of the end device has/have for a use, may independently access corresponding storage areas of the linkable computer infrastructure and retrieve and/or enter, for example, data there. Additionally, the end device may independently use processor or computing power of the linkable computer infrastructure in order to implement own program applications and/or program applications of the linkable computer infrastructure, and may independently access program applications of the linkable computer infrastructure and/or the program applications may be retrieved therefrom. For example, the device certificate may be transferred by the manufacturer of the end device during the course of the manufacturing process to this device, so the end device is transferred to a user by the manufacturer as early as with the device certificate.

For example, against this background, an access zone that may be separated from the functions of the linkable computer infrastructure and is connected upstream thereof is provided. On registration of the end device in the access zone, the functions, which with an enabling for use of the linkable computer infrastructure as described above, are available to the end device following successful identification thereof, are not yet available in the access zone, and may not be selected either, for example, by the end device itself or by an action of the user. At most, a function for registration of the end device in the access zone itself and/or a function for identification of the end device registered in the access zone is assumed hereby, where, in one embodiment, the access and selection options are strictly limited by the end device itself and/or by the user to the sub-functions necessary for the registration or identification in these cases.

The end device may be registered in the access zone using the device certificate, for example, by using the device certificate as an access password. For example, the device certificate may also be used to generate an access password by a one-way function, so with knowledge of the device certificate, the access password may be recognized as being reliable.

In one embodiment, the end device is registered in the access zone via a registration function specially provided and adapted for this purpose and which may be implemented in the framework of the functions of the linkable computer infrastructure. This provides that for registration in the access zone, retrieval of the registration function may be the sole function of the linkable computer infrastructure. The registration function may be retrieved by the end device and/or a user of the end device before registration, and also, for example, during the registration process, before an identification is then made. If successful, a corresponding "forwarding" occurs for use of the functions in the full range envisaged for the user. Registration may occur via checking of the device certificate and/or an access password correspondingly derived herefrom, for example, by a one-way function, by the registration function.

Following successful registration of the end device, the device is enabled for the subsequent process of identification in the access zone. In one embodiment, the end device registered in the access zone is identified by an identification function specially provided and adapted for this purpose. The identification function may be implemented in the framework of the functions of the linkable computer infrastructure. This provides that with an end device registered in the access zone, retrieval of the identification function may be the sole function of the linkable computer infrastructure, which may be retrieved by the end device registered in the access zone or by a user of the end device, before, with successful identification, corresponding "forwarding" occurs for use of the functions in the full range envisaged for the user.

The end device registered in the access zone may be identified, for example, by a specific interrogation of the user in that the user transfers data with respect to the end device to the identification function. Based on this, the function identifies the end device and, for example, determines reliability for use of the functions of the linkable computer-structure in the full range envisaged for the user and/or for the end device.

For example, the registration function and the identification function may be implemented in an access zone management process, which manages the procedures of acceptance in the access zone and the forwarding of the end device through the access zone for use of the functions of the linkable computer infrastructure.

The proposed process makes it possible for the end device, following successful registration in the access zone, to be able to independently (e.g., automatically) or by way of an action of the user acquire the identification and therewith "complete" enabling of the linkable computer infrastructure. As a result, the individual end device no longer is to be certificated for the entire linkable computer infrastructure and the corresponding certificate laboriously stored there. Instead, the trust, established by the device certificate, for the access zone of the linkable computer infrastructure may be initially regarded as sufficient by this infrastructure itself, and an identification and therefore "complete" enabling of the end device may be rendered dependent on the trust between the user and an institution responsible for the management of the identification function.

The access zone may be, for example, a demilitarized zone (DMZ). A demilitarized zone has safety-related, controlled ways of access to the computer infrastructure connected thereto. The safety-related, controlled ways of access may be, for example, one or more communication rule(s) and/or firewall(s). The demilitarized zone may be located between the external network (e.g., a Wide Area Network such as the Internet) and computer infrastructure. In one embodiment, the demilitarized zone is located between the end device, which is communicatively connected, for example, over an external network (e.g., a Wide Area Network such as the Internet) to the computer infrastructure (e.g., via a data link).

The access zone (e.g., demilitarized zone) may include an OPC UA server. The end device may include an OPC UA client, moreover. OPC UA server and OPC UA client may be connected together over a Wide Area Network, such as, for example, the Internet. Data may be transferred between OPC UA server and OPC UA client, for example, in encrypted form. The OPC UA server in the access zone may include an OPC UA PubSub subscriber module and/or an MQTT broker. Corresponding hereto, the end device and the OPC UA PubSub client located thereon may include an MQTT client. Details on the implementation of an OPC UA PubSub connection may be found inter alia in the OPC Unified Architecture Specification, Part 14: PubSub, Release 1.04, Feb. 6, 2018. The OPC UA server in the access zone may also have a module for defining the safety-related, controlled way of access. The module for defining the safety-related, controlled ways of access may be, for example, an access zone management. The access zone management may, for example, include a registration function and/or an identification function and/or also the module for defining the safety-related, controlled way of access. As a result of identification of the end device, the end device may access the computer infrastructure (e.g., by OPC UA PubSub via the OPC UA client located on the end device and the OPC UA server located in the access zone). The computer infrastructure may be accessed, for example, by the OPC UA server, via one or more programming interface(s) (e.g., APIs) of the computer infrastructure. The one or more programing interface(s) supply one or more service(s) in order to acquire the data of the end device (e.g., to store the data) and/or process the data. The one or more service(s) may be one or more cloud services.

The access zone management may include, for example, one or more end devices that have been registered in the access zone (e.g., by the (universal) device certificate).

The modules are modules implemented by software (e.g., computer-implemented modules).

For example, since OPC UA PubSub does not provide a security concept for connections between end devices, such as, for example, one or more field devices, and a computer infrastructure, such as, for example, a cloud, an access zone (e.g., a DMZ Landing zone) is set up between cloud and Wide Area Network or local network, in which, for example, the end device is located. In the access zone, end devices (e.g., field devices) register firstly with a standard device certificate such as, for example, the universal device certificate. Only after successful registration are the end devices, such as, for example, field devices, enabled for cloud connections. A cloud connection of this kind then allows communication of the end device via the OPC UA server in the access zone with the one or more programing interfaces (e.g., one or more APIs) of the computer infrastructure.

One aspect therefore provides a secure connection between end devices, such as, for example, field devices, and a computer infrastructure, such as, for example, a cloud, and secure data protection in the cloud during processing and storage of data of the end device. In contrast to a direct connection of the end devices (e.g., field devices according to industry 4.0 protocol (OPC UA Pub/Sub)), which does not have a security concept, a DMZ Landing zone is inserted between cloud and the local network. Field devices may therefore register firstly with a standard device certificate. This standard device certificate, (e.g., a universal device certificate) may be supplied by the operator of the computer infrastructure (e.g., a cloud). Device users and/or device manufacturers may play the universal certificate on the end device and therefore establish a connection to the computer infrastructure via the access zone. Only after identification by the access zone management, such as, for example, a DMZ Manager, are these field devices then enabled, for example, as described above.

In one embodiment, the access zone may be managed at least partially or completely by the computer infrastructure. The access zone management may have, for example, an identification function that is present and/or operated in the computer-infrastructure (e.g., in the form a software module or in another computer-implemented form). This has the advantage that establishment of a connection between the access zone and the computer infrastructure is initiated from the computer infrastructure in order to communicatively connect an end device to the computer infrastructure.

The institution responsible for the management of the identification function may be responsible for the complete management of the linkable computer structure, or else also be responsible for just a section (e.g., a user space) that is allocated to a specific user of the linkable computer infrastructure. The institution responsible for management of the identification function may be provided by the relevant user or be determined and, for example, controlled thereby.

In one embodiment, a plurality of user spaces allocated to different users respectively is supplied in the linkable computer infrastructure, where, for example, a user-specific device certificate is created for a particular user space. The end device is registered using the, for example, user-specific device certificate in a user-specific access zone connected upstream, for example, of the corresponding user space of the linkable computer infrastructure. By access of a function from the corresponding user space of the linkable computer infrastructure, the end device registered in the, for example, user-specific, access zone is identified. With successful identification of the end device, use of the linkable computer infrastructure in the corresponding user space is enabled for this device.

The linkable computer infrastructure is established for a plurality of users (e.g., via a respective allocation of corresponding spaces to the user). A space that is allocated to a user in the linkable computer infrastructure incorporates, for example, a delimited storage area on the storage device and/or the authorization to use and apply particular program applications by the relevant user (e.g., in connection with the data stored in the delimited storage area). In one embodiment, the program applications are stored on a separate storage area of the storage device, so a specific program application, in the case of desired access by a specific user (e.g., after verified authorization of the relevant user for this program application) is supplied to the processor device or computing device for execution.

The user-specific device certificate is, for example, valid only for the associated user space or a registration in the access zone upstream thereof and is therefore invalid for other user spaces and the corresponding access zones. Registration in a user-specific access zone provides, for example, that, from there, forwarding of the end device is possible only in the correspondingly allocated user space, and not in other user spaces. Therefore, access to storage areas of other user spaces and program applications exclusively allocated thereto is not possible.

One or more of the present embodiments allow a user to accordingly decide for themselves in what way they want the end device registered in the access zone, which may, for example, also be configured to be user-specific, to be identified, and therefore be enabled for use of the functions of the linkable computer infrastructure in "their" space. The user may also decide which security hurdles they want to provide in this connection. For example, a special trust of the user in the operator may be utilized for the identification, so a central certification of the end device may be omitted for the entire linkable computer infrastructure, and this significantly facilitates connection.

The user-specific device certificate may be supplied by the user. The user may hereby connect the end devices that the user rates trustworthy independently of a central certification or identification point or corresponding identification function of the linkable computer infrastructure.

A plurality of sub-user spaces may be supplied in the space allocated to the user. The spaces are each adapted for access by different sub-users. With successful identification, the end device is enabled for use of the linkable computer infrastructure in a corresponding sub-user space. Use in the sub-user space is, for example, taken to be that the end device is enabled only for use of functions for which the relevant sub-user has a corresponding a corresponding authorization. This may include, for example, that within a space allocated to the user, global functions of the linkable computer infrastructure that are available to all sub-users of this space exist. In this case, the end device has access to the global functions, and of the functions specific to the individual sub-user, only access to those functions that are enabled in the sub-user space. Examples of sub-users are, for example, individual users of end devices.

A structure of this kind may be provided, for example in the case where, firstly, an operator of a linkable computer infrastructure (e.g., a cloud service provider) generally supplies this to a plurality of companies that form the individual users, and allocates the plurality of companies corresponding spaces, respectively. If, accordingly, one of these companies is provided by a manufacturer of machines and systems having operation that may be monitored especially for maintenance and/or repair, then the manufacturer of the systems as a user may provide in the allocated user space of the linkable computer infrastructure individual sub-user spaces. The sub-users are provided by the operators of the systems of the relevant user. In this connection, different sub-users in each case have access only to the functions relevant to own systems, respectively, in the framework of the linkable computer infrastructure.

With access of the function from the linkable computer infrastructure to the end device registered in the access zone, the user of the end device inputs an identifier and/or the identifier is automatically input by the end device to the function. The end device is identified for the linkable computer infrastructure using the identifier. For example, the identifier is input to a function for management of the access zone implemented in the linkable computer infrastructure (e.g., a separately provided identification function). Prior definition of a corresponding identifier, optionally by a user of the linkable computer infrastructure, may reduce the effort required for identification. The identifier may be provided by a user identifier and/or a specific device identifier, where the device identifier may, for example, be dependent on specific (e.g., individually characteristic) hardware parameters of the end device.

In one embodiment, as a function of the linkable computer infrastructure, an access zone management of the linkable computer infrastructure accesses the end device registered in the access zone, and, for example, an identifier of the end device. Identification of the end device and enabling of the end device for use of the linkable computer infrastructure occur by way of the access zone management and, for example, using the identifier. This includes, for example, that in the program applications of the linkable computer infrastructure, the access zone management is provided and adapted as an independent registration and identification function, by which identification is made via the corresponding input (e.g., that of an identifier).

In one embodiment, the access zone management identifies the end device using a number of device-specific parameters. For example, these are device-specific parameters that may be provided by hardware parameters and/or hardware properties and/or hardware configurations, such as, for example, also pin settings, or may be stored by entries in a non-volatile storage device of the end device, individually characteristic of the end device. A device-specific parameter, which is stored in a non-volatile storage device of the end device may be, for example, special operating system or firmware settings. The corresponding parameters are stored in the access zone management, and on registration of an end device, may be compared for checking purposes. This may be done automatically (e.g., without a further input by a user of the end device).

The device certificate may be input separately by the linkable computer infrastructure in the end device (e.g., there is no data link from the end device to the linkable computer infrastructure at the instant of inputting of the device certificate in the end device). The input may be made, for example, via a wired connection to a USB storage device or to a computer separate from the linkable computer infrastructure. The computer is equipped with a corresponding storage medium.

In one embodiment, a Publish-Subscribe protocol is used for communication of the end device with the linkable computer infrastructure. Communication of an end device with a linkable computer infrastructure, such as, for example, a cloud service, may proceed on a request-response basis. This provides that for a specific request by a participant in the communications protocol to the other participant, a permanent connection and corresponding allocation is possible. With an increasing number of participants and, for example, with asymmetry (e.g., requests by a large number of "clients" to one "server", response of the one "server" to potentially a large number of "clients"), this may lead to a slowing down of communication. In a communications protocol according to the Publish-Subscribe principle, one participant publishes a message provided with a marker (e.g., "publish") that may be read a priori by any other participants. The other participants may themselves accordingly define the markers having messages the other participants even want to receive/read (e.g., "subscribe"). This simplifies communication in complex networks significantly. It is precisely for a connection of potentially a large number of end devices to the linkable computer infrastructure that a Publish-Subscribe protocol is therefore advantageous for a low communications overhead.

In one embodiment, the end device communicates with the linkable computer infrastructure in the framework of an OPC-UA protocol. The OPC-UA protocol is a protocol for automatic information exchange between end devices, as may be provided, for example, in industrial machines. To connect an end device to a linkable computer infrastructure (e.g., to a cloud service) in the framework of the OPC-UA protocol, the method of one or more of the present embodiments is advantageous since the protocol itself does not supply a standard for secure connection of end devices. This deficit may now be overcome with the present method.

In one or more of the present embodiments, a computer program product (e.g., including a non-transitory computer-readable storage medium) having program code for implementation of an access zone for a higher-order, linkable computer infrastructure for connection of at least one end device, and for implementation of access of at least one function from the linkable computer infrastructure in the access zone when the computer program product is run on at least one computer of the linkable computer infrastructure is provided. The at least one end device may be registered in the implemented access zone using a device certificate, where by way of the implemented access of the function to the at least one end device registered in the access zone, the end device may be identified for the linkable computer infrastructure. With successful identification of the end device, use of the linkable computer infrastructure is enabled for this device.

The advantages disclosed for the method and for corresponding developments may be correspondingly transferred to the computer program product. In one embodiment, the computer program product is stored on a storage device of the linkable computer infrastructure and is run on a processor or computing device of the linkable computer infrastructure.

In one or more of the present embodiments, a linkable computer infrastructure including a number of ports for establishing at least one data link, respectively, to a, for example, external end device (e.g., not associated with the linkable computer infrastructure) is provided. The linkable computer infrastructure also includes a non-volatile storage device for storing a device certificate, and at least one computer having at least one processor. The computer is configured to implement an access zone connected upstream of the linked infrastructure. In the access zone, an end device connected by a port may be registered using the device certificate. The computer is also configured to implement access of a function from the linkable computer infrastructure to the end device registered in the access zone for the identification thereof for the linkable computer infrastructure. For successful identification of the end device, the computer is configured to implement use of the linkable computer infrastructure for this device.

The advantages disclosed for the method and for corresponding developments may be correspondingly transferred to the linkable computer infrastructure. In one embodiment, the linkable computer infrastructure is implemented as a cloud service.

BRIEF DESCRIPTION OF THE DRAWINGS

FIG. 1 shows in a block diagram one embodiment of a method for connecting an end device in a linkable computer infrastructure.

DETAILED DESCRIPTION

FIG. 1 schematically shows in a block diagram one embodiment of a method by which an end device 1 is connected to a linkable computer infrastructure 2. In the present case, the linkable computer infrastructure 2 is provided by a cloud service that is structurally divided into different spaces 4 that are each allocated to different users 6. This includes, for example, storage areas that are separate from each other, in the storage area of the linkable computer infrastructure 2, as well as, optionally, also access to different functions and/or applications of the linkable computer infrastructure 2 for the spaces 4 allocated to different users.

The end device 1 is to be connected for communication with a specific user space 4a of the linked computer infrastructure 2 via an OPC-UA-Pub/Sub protocol, with a particular user 6a being allocated to the user space 4a. For this, a user-specific device certificate 8 is created by a function in the user space 4a. This may be done by the user 6a, or also, on initiative by the user 6a, by the operator of the cloud service, which forms the linkable computer infrastructure 2. The operator 10 of the end device 1 may download the device certificate 8a 14 from the linkable computer infrastructure 2 via a data link 12 from a corresponding portal. The portal 14 is connected to the user space 6a such that corresponding device certificates 8, 8a for download may only be supplied from this user space 6a. Separate portals may be supplied for the other users 6, and the device certificates may be supplied by the separate portals, which are not shown in detail here.

The operator 10 of the end device 1 transfers the device certificate 8a to the end device 1. This may be done, for example, by direct, immediate forwarding of the device certificate 8a downloaded to a computer to the end device 1, which is connected to the computer, or also with the aid of a non-volatile storage medium on which the device certificate 8a is stored and from which, optionally via a computer, a connection to the end device 1 is established for transmission of the device certificate 1.

Via a further data link 16, which may be wireless or wired, the end device 1 is now connected to a port 18, which may be regarded structurally as part of the linkable computer infrastructure 2 (e.g., in the form of an access port to a server or the like).

On connection with the port 18, the end device is not connected to a back-end of the linkable computer infrastructure 2 or an authentication assistant, however, for direct access to the back-end. Instead, on establishing the data link 16 to the port 18 of the actual linkable computer infrastructure 2 (e.g., complete use of functions by the end device 1 in the framework of authorization of the user space 4a), an access zone 20 is connected upstream or interconnected. In this connection, the access zone is generally to be implemented by corresponding functions of the linkable computer infrastructure 2, so use of actual functions (e.g., access to storage area, computing power and program applications) is "shielded" by the access zone depending on the authorization of a user and of an operator of an end device for connection.

The device certificate 8a is transmitted from the end device 1 via the data link 16 to an access zone management 22. The access zone management 22 is implemented in the access zone, for example, as a special function of the linkable computer infrastructure 2. This may occur, for example, in combination with a log-in ID 24 specific to the operator, or in isolation in response to a request by the access zone management 22. Based on the device certificate 8a, the access zone management 22 identifies an authorization of the end device 1 for the access zone 20 and registers this device.

The registered end device 1 is now "parked" in the access zone 20 until the registered end device 1 has been completely identified. The identification may be made by an input 26 of the operator 10 to a corresponding identification function 28, which is implemented in the user space 4a of the linkable computer infrastructure 2, and/or based on an identifier 30 that is individually associated with the end device 1, and is stored, moreover, in the identification function 28 for identification of the end device 1.

Following successful identification by the identification function 28, the access zone management 22 is accordingly informed that the end device has authorization to use the linkable computer infrastructure 2 in the framework of the functions provided in the user space 4a. The access zone management 22, which may be in the form, for example, of an MQTT broker, allocates the end device 1 a use token 32 for this use, which may be identified by the corresponding user space 4a. Allocation of the use token 32 therefore grants the end device 1 access to the functions (e.g., to storage area, computing power, and program applications) in the user space 4a of the linkable computer infrastructure 2.

Although the invention has been illustrated and described in detail by the exemplary embodiments, the invention is not restricted by this exemplary embodiment. A person skilled in the art may derive other variations herefrom without departing from the scope of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for connecting an end device to a linkable computer infrastructure, the method comprising:
   creating a device certificate and supplying the created device certificate to a user of the end device;
   inputting the created device certificate into the end device;
   producing a data link from the end device to an access zone connected upstream of functions of the linkable computer infrastructure, the access zone being selectively separable from the functions of the linkable computer infrastructure by the data link, wherein a cloud service is used as the linkable computer infrastructure and wherein the access zone is a demilitarized zone;
   registering the end device in the access zone using the created device certificate;
   identifying the end device for the linkable computer infrastructure by access of a function from the linkable computer infrastructure to the end device registered in the access zone;
   accessing, by an access zone management, the end device registered in the access zone as a function of the linkable computer infrastructure;
   identifying the end device, enabling the end device for use of the linkable computer infrastructure by the access zone management, or a combination thereof,
   enabling use of the linkable computer infrastructure for the end device in response to successful identification of the end device;
   supplying a plurality of user spaces assigned to different users, respectively, in the linkable computer infrastructure;
   identifying the end device registered in the access zone by access of a function from a corresponding user space of the linkable computer infrastructure;
   allocating, by the access zone management, the end device a use token for the corresponding user space of the linkable computer infrastructure; and
   granting the end device access to the function of the corresponding user space by the allocation of the use token.

2. The method of claim 1, wherein a user-specific device certificate is created for a particular user space,
   wherein, using the user-specific device certificate, the end device is registered in a user-specific access zone connected upstream of the corresponding user space of the linkable computer infrastructure, and
   wherein the end device registered in the user-specific access zone is identified by access of a function from the corresponding user space of the linkable computer infrastructure.

3. The method of claim 1, wherein the user-specific device certificate is supplied by the user.

4. The method of claim 1, wherein in a user space, a plurality of sub-user spaces is supplied, the plurality of sub-user spaces being adapted for access by different sub-users, respectively, and
   wherein with successful identification, the end device is enabled for use of the linkable computer infrastructure in a corresponding sub-user space.

5. The method of claim 1, wherein on access of the function from the linkable computer infrastructure to the end device registered in the access zone, an input of an identifier is made by the user of the end device, an automatic input of the identifier is made by the end device to the function, or a combination thereof, and
   wherein the end device is identified using the identifier for the linkable computer infrastructure.

6. The method of claim 1, wherein the access zone management identifies the end device using a number of device-specific parameters.

7. The method of claim 1, wherein the device certificate is input into the end device during manufacture of the end device in a storage device of the end device, by connection of a non-volatile storage medium, on which the device certificate is stored, to the end device, or a combination thereof.

8. The method of claim 1, wherein a publish-subscribe protocol is used for communication of the end device with the linkable computer infrastructure.

9. The method of claim 1, wherein communication of the end device with the linkable computer infrastructure takes place in the framework of an OPC-UA protocol.

10. The method of claim 1, wherein the end device is enabled for use of the linkable computer infrastructure by allocation of the use token to the end device by the access zone management.

11. In a non-transitory computer-readable storage medium that stores instructions executable by one or more processors for implementation of an access zone for a higher-order, linkable computer infrastructure for connection of at least one end device, and for implementation of access of at least one function from the linkable computer infrastructure in the access zone connected upstream of functions of the linkable computer infrastructure, the instructions comprising:
  creating a device certificate and supplying the created device certificate to a user of the at least one end device;
  inputting the created device certificate into the at least one end device;
  producing a data link from the at least one end device to the access zone, the access zone being selectively separable from the functions of the linkable computer infrastructure by the data link, wherein a cloud service is used as the linkable computer infrastructure and wherein the access zone is a demilitarized zone;
  registering the at least one end device in the implemented access zone using the device certificate;
  identifying the at least one end device for the linkable computer infrastructure via the implemented access of the at least one function to the at least one end device registered in the access zone;
  accessing, by an access zone management, the at least one end device registered in the access zone as a function of the linkable computer infrastructure;
  identifying the at least one end device, enabling the at least one end device for use of the linkable computer infrastructure by the access zone management, or a combination thereof;
  enabling use of the linkable computer infrastructure for the at least one end device in response to successful identification of the at least one end device;
  supplying a plurality of user spaces assigned to different users, respectively, in the linkable computer infrastructure;
  identifying the at least one end device registered in the access zone by access of a function from a corresponding user space of the linkable computer infrastructure;
  allocating, by the access zone management, the at least one end device a use token for the corresponding user space of the linkable computer infrastructure; and
  granting the at least one end device access to the function of the corresponding user space by the allocation of the use token.

12. A linkable computer infrastructure comprising:
  a number of ports configured to establish at least one data link, respectively, to an end device;
  a non-volatile storage device configured to store a device certificate; and
  at least one computer having at least one processor, wherein the computer is configured to:
    implement an access zone connected upstream of functions of the linkable computer infrastructure, wherein the end device connected by a port of the number of ports is registerable using the device certificate in the access zone, the access zone being selectively separable from the functions of the linkable computer infrastructure, wherein the linkable computer infrastructure is configured as a cloud service and wherein the access zone is a demilitarized zone;
    implement access of a function from the linkable computer infrastructure to the end device registered in the access zone for the identification thereof for the linkable computer infrastructure;
    implement access, for an access zone management, to the end device registered in the access zone as a function of the linkable computer infrastructure;
    implement identification of the end device, implement enablement of the end device for use of the linkable computer infrastructure by the access zone management, or a combination thereof,
    for successful identification of the end device, implement use of the linkable computer infrastructure for the end device;
    supply a plurality of user spaces assigned to different users, respectively, in the linkable computer infrastructure;
    implement identification of the end device registered in the access zone by access of a function from a corresponding user space of the linkable computer infrastructure;
    implement allocation of, by the access zone management, a use token to the end device for the corresponding user space of the linkable computer infrastructure; and
    implement the granting of the end device access to the function of the corresponding user space by the allocation of the use token.

13. The linkable computer infrastructure of claim 12, wherein with successful identification of the end device, use of the linkable computer infrastructure in the corresponding user space is enabled for the end device.

* * * * *